US011672358B2

(12) United States Patent
Watanabe et al.

(10) Patent No.: US 11,672,358 B2
(45) Date of Patent: Jun. 13, 2023

(54) HOLDER INCLUDING A VERTICAL HOLDING PART

(71) Applicant: Ai-met NEO CO., LTD., Tokyo (JP)

(72) Inventors: Tomoya Watanabe, Maebashi (JP); Akihiko Ishida, Kiryu (JP); Yasuo Aihara, Tokyo (JP)

(73) Assignee: AI-MET NEO CO., LTD., Tokyo (JP)

( * ) Notice: Subject to any disclaimer, the term of this patent is extended or adjusted under 35 U.S.C. 154(b) by 0 days.

(21) Appl. No.: 17/873,513

(22) Filed: Jul. 26, 2022

(65) Prior Publication Data

US 2022/0354268 A1 Nov. 10, 2022

Related U.S. Application Data

(63) Continuation of application No. 17/098,806, filed on Nov. 16, 2020, now Pat. No. 11,445,832.

(30) Foreign Application Priority Data

Dec. 13, 2019 (JP) .............................. JP2019-225820
Mar. 9, 2020 (JP) .............................. JP2020-040338

(51) Int. Cl.
| A47D 1/00 | (2006.01) |
| A47D 1/08 | (2006.01) |
| A47D 1/06 | (2006.01) |
| B60N 2/28 | (2006.01) |
| B62B 9/22 | (2006.01) |

(Continued)

(52) U.S. Cl.
CPC .............. *A47D 1/006* (2013.01); *A47D 1/06* (2013.01); *A47D 1/08* (2013.01); *B60N 2/2821* (2013.01); *B60N 2/2839* (2013.01); *B60N 2/2848* (2013.01); *B62B 7/12* (2013.01); *B62B 9/22* (2013.01); *B62B 9/24* (2013.01)

(58) Field of Classification Search
CPC .... A47D 13/105; A47D 13/025; A47D 1/006; A47D 1/06; A47D 13/10; A47D 1/08; A47D 13/08; A47C 9/005; B62B 9/24; B62B 9/22; B60N 2/2839; B60N 2/56
USPC ............................................ 297/423.11, 383
See application file for complete search history.

(56) References Cited

U.S. PATENT DOCUMENTS

| 2,970,638 | A | * | 2/1961 | Halter ................... | A47C 7/029 |
| | | | | | 297/452.36 |
| 2,973,031 | A | * | 2/1961 | Cramer, Jr. ............ | A47C 7/185 |
| | | | | | 297/383 |
| 4,572,578 | A | | 2/1986 | Perkins | |

(Continued)

FOREIGN PATENT DOCUMENTS

| GB | 2077114 | 12/1981 |
| JP | 2016-221269 | 12/2016 |

(Continued)

OTHER PUBLICATIONS

Japanese Office Action, Japanese Application No. 2020-040338, dated Jul. 26, 2022, English translation included, 10 pages.

*Primary Examiner* — Milton Nelson, Jr.
(74) *Attorney, Agent, or Firm* — Rankin, Hill & Clark LLP (57) ABSTRACT

A holder includes a vertical holding part configured to support an infant in a vertical posture so that the head is positioned vertically, in which the vertical holding part has a front pad part extending in a vertical direction and configured to support the infant from a front of the infant, at least from the abdomen to the chest of the infant.

11 Claims, 7 Drawing Sheets

(51) Int. Cl.
  *B62B 9/24* (2006.01)
  *B62B 7/12* (2006.01)

(56) References Cited

U.S. PATENT DOCUMENTS

| | | | |
|---|---|---|---|
| 4,832,407 A | 5/1989 | Serber | |
| 4,911,429 A | 3/1990 | Ogbu | |
| 6,416,132 B1 | 7/2002 | Norton | |
| 6,959,962 B2 | 11/2005 | Dixon | |
| 8,070,221 B2 * | 12/2011 | Turner | A61B 90/60 |
| | | | 297/195.11 |
| 10,117,523 B1 | 11/2018 | Hionakis | |
| 2007/0277309 A1 | 12/2007 | Shane et al. | |
| 2016/0157618 A1 | 6/2016 | Arnett | |
| 2021/0139149 A1 | 5/2021 | Toscano | |

FOREIGN PATENT DOCUMENTS

| | | | |
|---|---|---|---|
| JP | 2019-076629 | 5/2019 | |
| KR | 101844733 | 4/2018 | |
| WO | WO-02058601 A1 * | 8/2002 | A61F 5/04 |
| WO | 2010/070156 | 6/2010 | |

* cited by examiner

HOLDER INCLUDING A VERTICAL HOLDING PART

CROSS-REFERENCE TO RELATED APPLICATION

This application is a continuation of U.S. application Ser. No. 17/098,806, filed Nov. 16, 2020, now issued as U.S. Pat. No. 11,445,832, the contents of which is incorporated herein by reference. Furthermore, priority is claimed on Japanese Patent Application Nos. 2019-225820, filed Dec. 13, 2019, and 2020-040338 filed Mar. 9, 2020, the contents of which are incorporated herein by reference.

BACKGROUND OF THE INVENTION

Field of the Invention

The present invention relates to a holder.

Description of Related Art

As a swing holder, for example, a device is known which swings an infant or a baby (hereinafter referred to as an infant) like a pendulum while the infant is seated (for example, see Japanese Unexamined Patent Application, First Publication No. 2016-221269 (hereinafter, Patent Document 1)). As a result, the infant can be provided with a comfortable swing, and the infant can be soothed and entertained.

In the related art, a sling is used in a state of holding the infant in a vertical position so that the head of the infant is positioned upward (hereinafter, this state is referred to as a vertically held state) (for example, see Japanese Unexamined Patent Application, First Publication No. 2019-76629 (hereinafter, Patent Document 2)). The sling can reduce the amount of effort necessary for the parents to hold the infant.

SUMMARY OF THE INVENTION

In a case in which a parent wants to perform household duties while the infant is soothed in a vertically held state using a sling as in Patent Document 2, for example, when trying to lay the soothed baby on a bed sideways, the infant may get up and the parents may not be able to take their hands away from the infant.

The swing holder of Patent Document 1 can be used when an infant is awake, but there is a possibility that the posture of the infant will become unstable when trying to put the infant to sleep. There is also a possibility that the swing holder may be difficult to use for an infant who sleeps in a vertically held state. Although there are holders that swing while the infant is laid sideways, some infants prefer a vertically held state.

An aspect according to the present invention has been made in consideration of such circumstances, and one of the objects is to provide a holder capable of soothing an infant in a vertically held state.

In order to solve the aforementioned problems and achieve at least one of the objects concerned, the present invention has adopted the following aspects.

(1): A holder according to an aspect of the present invention includes a vertical holding part configured to support a user in a vertical posture so that a head is positioned vertically, in which the vertical holding part has a front pad part extending in a vertical direction and configured to support the user from a front of the user, at least from an abdomen to a chest of the user.

According to the aforementioned aspect (1), the vertical holding part can maintain the natural posture of a user (for example, an infant) in a vertical orientation. Therefore, the infant can be soothed in a vertically held state.

(2): In the aforementioned aspect (1), the holder may have a carrier configured to support a lower side and a back of the user.

According to the aforementioned aspect (2), the vertically held state of the user can be further stabilized by the carrier.

(3): In the aforementioned aspect (2), the carrier may have a seat part configured to hold at least the back of the user and a band part configured to suspend the seat part, and the holder may include a band support part provided above the vertical holding part and configured to support the band part.

According to the aforementioned aspect (3), when the band support part is provided above the vertical holding part and the band part is suspended on the band support part, the user held by the seat part is attracted toward the vertical holding part side by his or her own weight. Therefore, the user can be brought into close contact with the vertical holding part, and a feeling of security may be provided to the user. Therefore, the infant can be more reliably soothed in a vertically held state.

(4): In any one of the aforementioned aspects (1) to (3), a temporary seating surface on which the user is placeable may be provided below the vertical holding part.

According to the aforementioned aspect (4), after the user is temporarily placed on the temporary seating surface, the user can be supported by the vertical holding part. Therefore, it is possible to reduce the burden on the parent using the holder to hold the user.

(5): In any one of the aforementioned aspects (1) to (4), the vertical holding part may have at least one bulging part in which a central part in a left-right direction bulges toward the user side from both sides in the left-right direction orthogonal to a direction between the user side and a side opposite to the user and the vertical direction, the bulging part extending in the vertical direction of the vertical holding part.

According to the aforementioned aspect (5), the user can be supported by the vertical holding part without placing the user in an unreasonable posture. Compared with a case where the vertical holding part is flat, the pressure on the user can be reduced.

(6): In the aforementioned aspect (5), two bulging parts may be disposed side by side in the left-right direction.

According to the aforementioned aspect (6), the head of the user can be placed between the two bulging parts, and the head can be stabilized.

(7): In the aforementioned aspect (5) or (6), the vertical holding part may have a convex part protruding toward the user, and the bulging parts may be disposed above the convex part.

According to the aforementioned aspect (7), it is possible to obtain a feeling of security in which the user supported by the vertical holding part is held in a manner simulating that of a mother's body.

(8): In any one of the aforementioned aspects (1) to (7), the vertical holding part may be attachable to and detachable from a mounting body.

According to the aforementioned aspect (8), for example, only the vertical holding part need be carried around. The vertical holding part can be attached to various mounting bodies, and the vertical holding part can be used in various situations and applications. Therefore, it is possible to provide a holder that is easy to use.

(9): In the aforementioned aspect (8), the holder may further include an attachment configured to attach and detach the vertical holding part to and from the mounting body.

According to the aforementioned aspect (9), the vertical holding part can be easily attached to and detached from the mounting body by attachment.

(10): In the aforementioned aspect (8) or (9), the mounting body may be a swing mechanism configured to swing the vertical holding part.

According to the aforementioned aspect (10), the swing mechanism can provide a comfortable swing to the user. Therefore, for this reason, the infant can be soothed in a vertically held state.

(11): In the aforementioned aspect (10), the swing mechanism may swing the vertical holding part in at least one of a vertical direction and a pivoting direction.

According to the aforementioned aspect (11), the user may be provided with a comfortable swing. Therefore, the infant can be further soothed in a vertically held state.

(12): In the aforementioned aspect (10) or (11), the swing mechanism may be disposed below the vertical holding part, and a position of a center of gravity of the swing mechanism may be on a side opposite to a position of the user with the vertical holding part therebetween.

According to the aforementioned aspect (12), when the holder is used, it is possible to prevent the holder from tilting due to the weight of the user and causing the holder to fall.

According to these aspects of the present invention, it is possible to provide a holder capable of soothing an infant in a vertically held state.

DETAILED DESCRIPTION OF THE INVENTION

Next, an embodiment of the present invention will be described on the basis of the drawings.
<Swing Holder>

Figure 1:
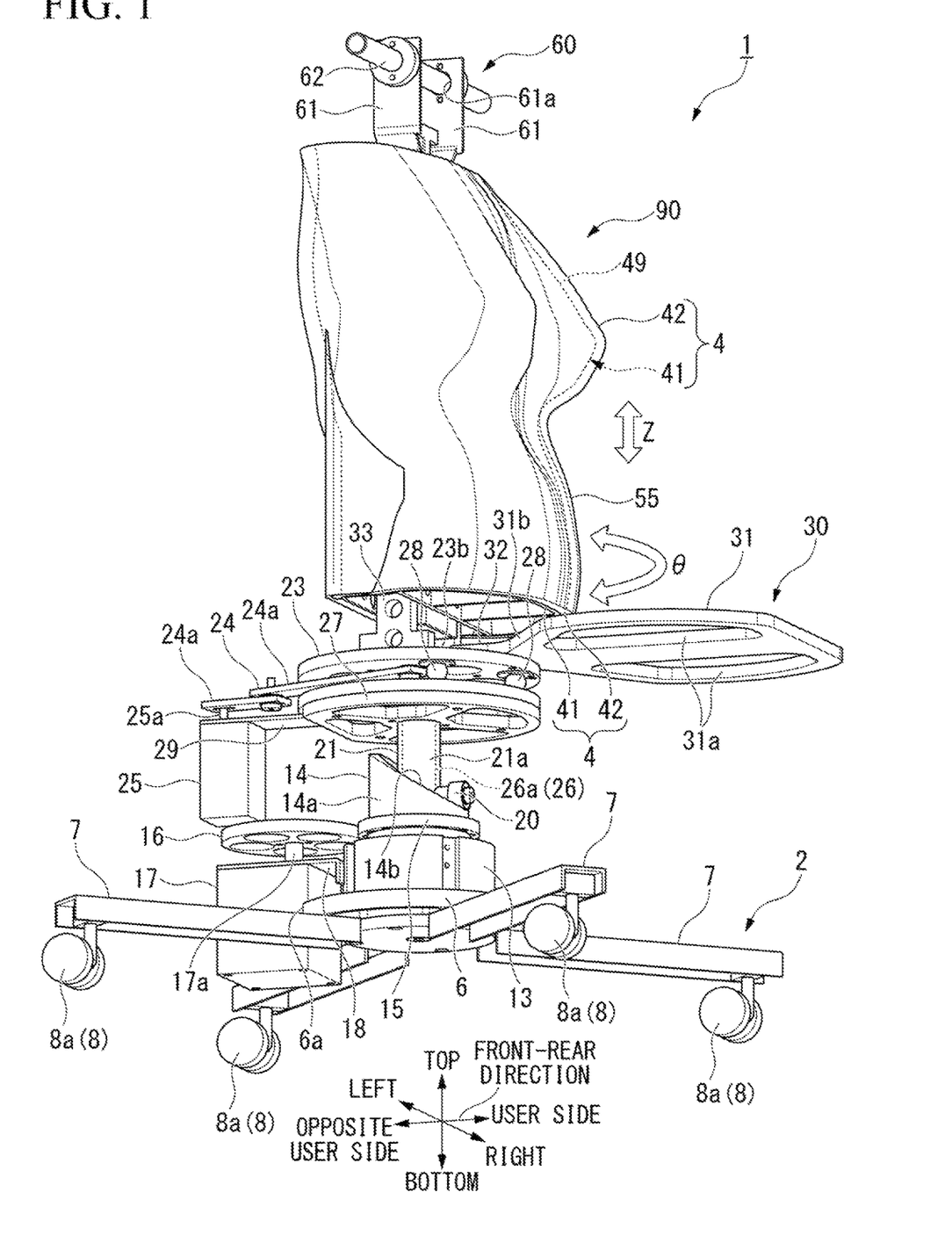
FIG. 1 is a perspective view of a swing holder according to an embodiment of the present invention.
Figure 2:
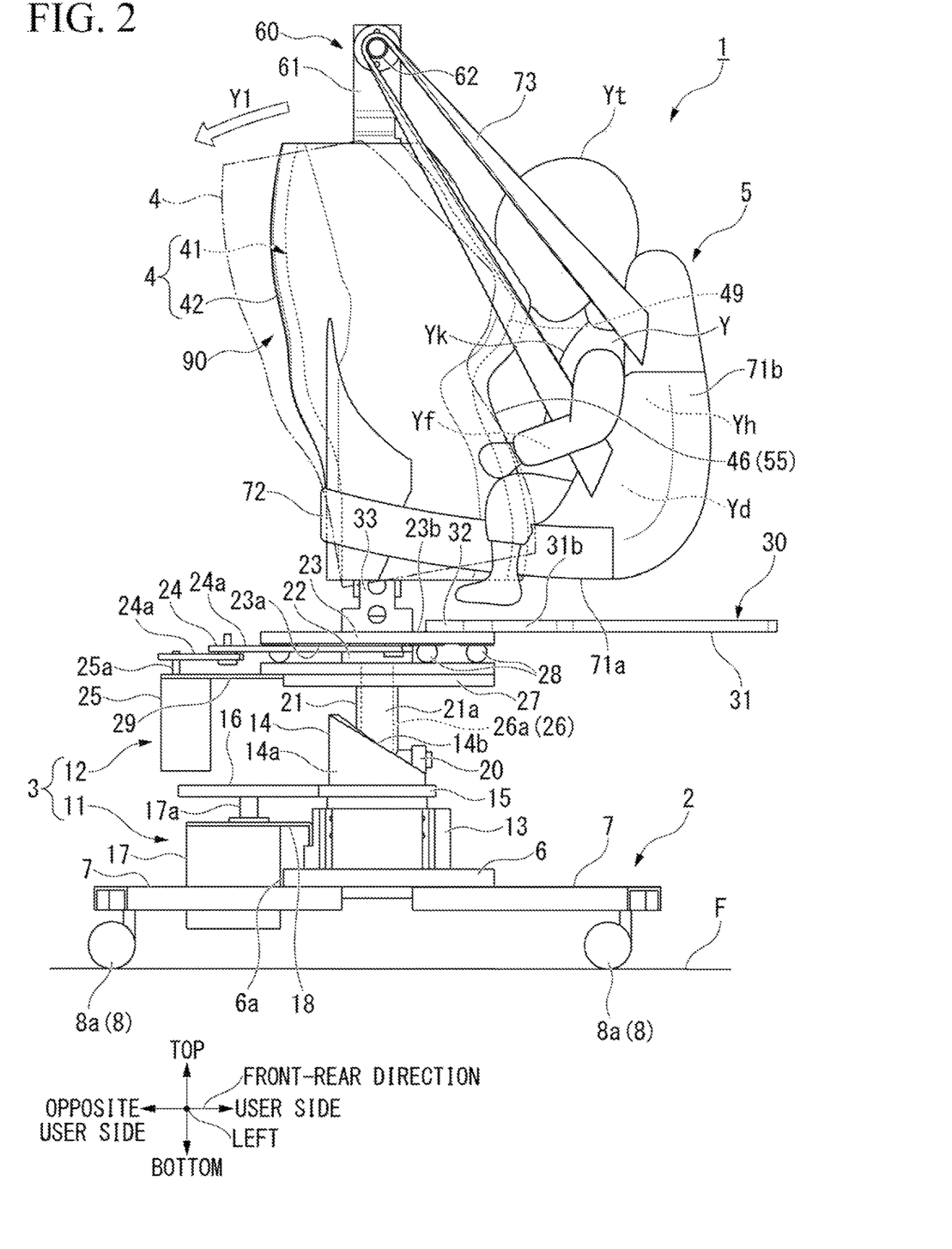
FIG. 2 is an explanatory view showing a state of the swing holder being used by an infant according to the embodiment of the present invention.

FIG. 1 is a perspective view of a swing holder 1. FIG. 2 is an explanatory view showing a state of the swing holder 1 being used by an infant Y. FIG. 1 shows a state in which a carrier 5 of the swing holder 1 is detached. In the following description, a vertical direction in which the swing holder 1 is placed on a floor F in a usable state is simply referred to as the vertical direction.

As shown in FIGS. 1 and 2, the swing holder 1 is mainly used for an infant Y. The swing holder 1 mainly includes a base part 2, a swing mechanism 3 provided on the base part 2, a holder 90 provided on the swing mechanism 3, and a carrier 5 suspended from an upper part of the holder 90.

The holder 90 has a vertical holding part 4. The infant Y is supported in a vertical posture in which the head Yt is located at the top and holds the vertical holding part 4 from the front while facing the vertical holding part 4. In the following description, an infant Y side on which the vertical holding part 4 is held from the vertical holding part 4 is referred to as a user side, and the side opposite to the user side is referred to as a side opposite to the user. The direction between the user side and the side opposite to the user is referred to as a front-rear direction. A left-right direction with respect to the infant Y holding the vertical holding part 4 is simply referred to as a left-right direction. A surface direction of a surface of which a direction normal thereto is the vertical direction may be referred to as a horizontal direction. The directions toward the user side and the side opposite to the user, and the left-right direction are parallel to the horizontal direction.
<Base Part>

The base part 2 has a disc-shaped base part main body 6. The surface direction of the base part main body 6 extends along the horizontal direction. A flat part 6a having a shape, in which part of the base part main body 6 is cut off, is formed on the side opposite to the user of an outer peripheral portion of the base part main body 6. The flat part 6a is for positioning part of the swing mechanism 3.

On the outer peripheral portion of the base part main body 6, four base arms 7 extending along a radial direction of the base part main body 6 are provided radially at equal intervals in a circumferential direction. Each base arm 7 is disposed to avoid the flat part 6a of the base part main body 6. A caster 8 is provided at a tip of each base arm 7. A wheel 8a of the caster 8 allows the swing holder 1 to travel on the floor F.
<Swing Mechanism>

The swing mechanism 3 includes a first swing mechanism part 11 provided on the base part main body 6, and a second swing mechanism part 12 provided on the first swing mechanism part 9.

The first swing mechanism part 11 has a cylindrical first support 13 provided on the base part main body 6. A central axis of the first support 13 extends along the vertical direction. A cylindrical swing guide 14 disposed concentrically with the first support 13 is supported inside the first support 13 in the radial direction in a freely rotatable manner. The upper part of the swing guide 14 protrudes from the first support 13.

An inclined surface 14b inclined to gradually move upward from the user side toward the side opposite to the user is formed on the upper end of the swing guide 14 in the protruding part 14a of the protruding swing guide 14. The inclined surface 14b regulates a swing direction of the vertical holding part 4 (details will be described later). In the protruding part 14a of the swing guide 14, a first external gear 15 is provided below the inclined surface 14b. The first external gear 15 is disposed concentrically with the swing guide 14 and rotates integrally with the swing guide 14.

A second external gear 16 is meshed with the first external gear 15. The second external gear 16 is disposed on the side opposite to the user of the first external gear 15. A motor shaft 17a of a first motor 17 is attached to the second external gear 16. The second external gear 16 is rotated by the first motor 17. The first motor 17 is fixed to the first support 13 via a bracket 18. A side surface of the first motor 17 is in contact with the flat part 6a of the base part main body 6. As a result, the first motor 17 is suitably positioned with respect to the base part main body 6.

The second swing mechanism part 12 has a cylindrical support case 21 disposed inside the swing guide 14 in the first swing mechanism part 11 in the radial direction. The support case 21 is disposed concentrically with the swing guide 14. The support case 21 is provided to be freely rotatable with respect to the swing guide 14 and freely movable in the vertical direction. The upper part of the support case 21 protrudes upward via the inclined surface 14b of the swing guide 14. A disk-shaped base plate 27 is provided at an upper end of the support case 21. The base plate 27 is disposed concentrically with the support case 21. The base plate 27 supports a turntable 23 and a second motor 25, which will be described later.

Inside the support case 21, a support shaft 26 is provided to be freely rotatable with respect to the support case 21 and freely movable in the vertical direction. Like the support case 21, the support shaft 26 also protrudes upward via the inclined surface 14b of the swing guide 14.

A roller 20 is provided on the user side of the protruding part 26a of the protruding support shaft 26. The roller 20 protrudes from an outer peripheral surface of the support case 21 via the support case 21. The roller 20 is disposed on the inclined surface 14b of the swing guide 14. When the support shaft 26 rotates, the roller 20 moves along the inclined surface 14b of the swing guide 14.

The upper end of the protruding part 26a of the support shaft 26 protrudes from the support case 21. A disc-shaped turntable 23 is provided at the upper end of the protruding part 26a via an attachment 22. The turntable 23 is disposed concentrically with the support shaft 26 and is provided with respect to the support shaft 26 in a freely rotatable manner.

An outer diameter of the turntable 23 is almost the same as an outer diameter of the base plate 27. A plurality of ball casters 28 are disposed at equal intervals in the circumferential direction between the turntable 23 and the base plate 27. The ball casters 28 support the turntable 23 with respect to the base plate 27 in a freely rotatable manner.

A motor shaft 25a of the second motor 25 is attached to a lower surface 23a of the turntable 23 via a link mechanism 24 on the side opposite to the user of the outer peripheral portion.

The link mechanism 24 connects a plurality of (for example, two in this embodiment) link arms 24a in a freely rotatable manner. One end of the link mechanism 24 (an end portion of one link arm 24a) is connected to the turntable 23. The other end of the link mechanism 24 (an end portion of the other link arm 24a) is attached to the motor shaft 25a of the second motor 25.

The second motor 25 is fixed to the base plate 27 via the bracket 29. The bracket 29 extends from the base plate 27 toward the side opposite to the user.

Under such a configuration, when the motor shaft 25a of the second motor 25 is rotated in one direction, the turntable 23 pivots and swings within a predetermined rotation angle range via the link mechanism 24.

Here, because the first motor 17 and the second motor 25 are located on the side opposite to the user with respect to the support shaft 26, the entire center of gravity of the swing mechanism 3 is located on the side opposite to the user with respect to the support shaft 26.

A temporary seating surface 30 is attached to an upper surface 23b of the turntable 23 on the user side of the outer peripheral portion. The temporary seating surface 30 pivots and swings integrally with the turntable 23. The temporary seating surface 30 is where, for example, the parent temporarily seats the infant Y when the parent uses the swing holder 1 to the infant Y.

The temporary seating surface 30 is a plate-shaped member whose surface direction is along a horizontal plane. The temporary seating surface 30 has a seating surface main body 31 extending in the left-right direction when viewed in the vertical direction and a mounting part 32 extending from the side of the seating surface main body 31 opposite to the user formed integrally therein. The seating surface main body 31 is a place on which the infant Y is seated.

The mounting part 32 is disposed at the center of the seating surface main body 31 in the left-right direction. The mounting part 32 is mounted on the upper surface 23b of the turntable 23.

An opening 31a is formed in most of the seating surface main body 31. Breathability for the seating surface main body 31 is ensured by the opening 31a, and reduction in weight of the seating surface main body 31 is thus obtained. On the side opposite to the user of the seating surface main body 31, inclined sides 3 lb are formed to be inclined to taper from both sides in the left-right direction toward the mounting part 32. A space is ensured on the side opposite to the user of the seating surface main body 31 and on both sides across the mounting part 32 by the inclined sides 3 lb. This space can be used as a space for stretching the legs of the infant Y when the infant Y is seated on the seating surface main body 31.

The vertical holding part 4 is supported on the upper surface 23b of the turntable 23 via the support plate 33. The support plate 33 is a plate-shaped member extending upward from the upper surface 23b of the turntable 23. The vertical holding part 4 is supported to be tiltable (freely rotatable) with respect to the axial direction of the support plate 33. That is, the vertical holding part 4 is located substantially directly above the support shaft 26. The vertical holding part 4 is integrated with the turntable 23 via the support plate 33.

<Vertical Holding Part>

The vertical holding part 4 includes a framework 41 that forms an outer shell of the vertical holding part 4, and a cushion part 42 that covers an outer surface of the framework 41. The cushion part 42 is formed to correspond to an outer shape of the framework 41. Details of the outer shape of the framework 41 will be described later. The cushion part 42 is formed of a soft material such as urethane resin. However, the present invention is not limited thereto, and the cushion part 42 may be made of a softer material than that of the framework 41. Further, it is desirable that the cushion part 42 be formed of a material having good breathability.

Figure 3:
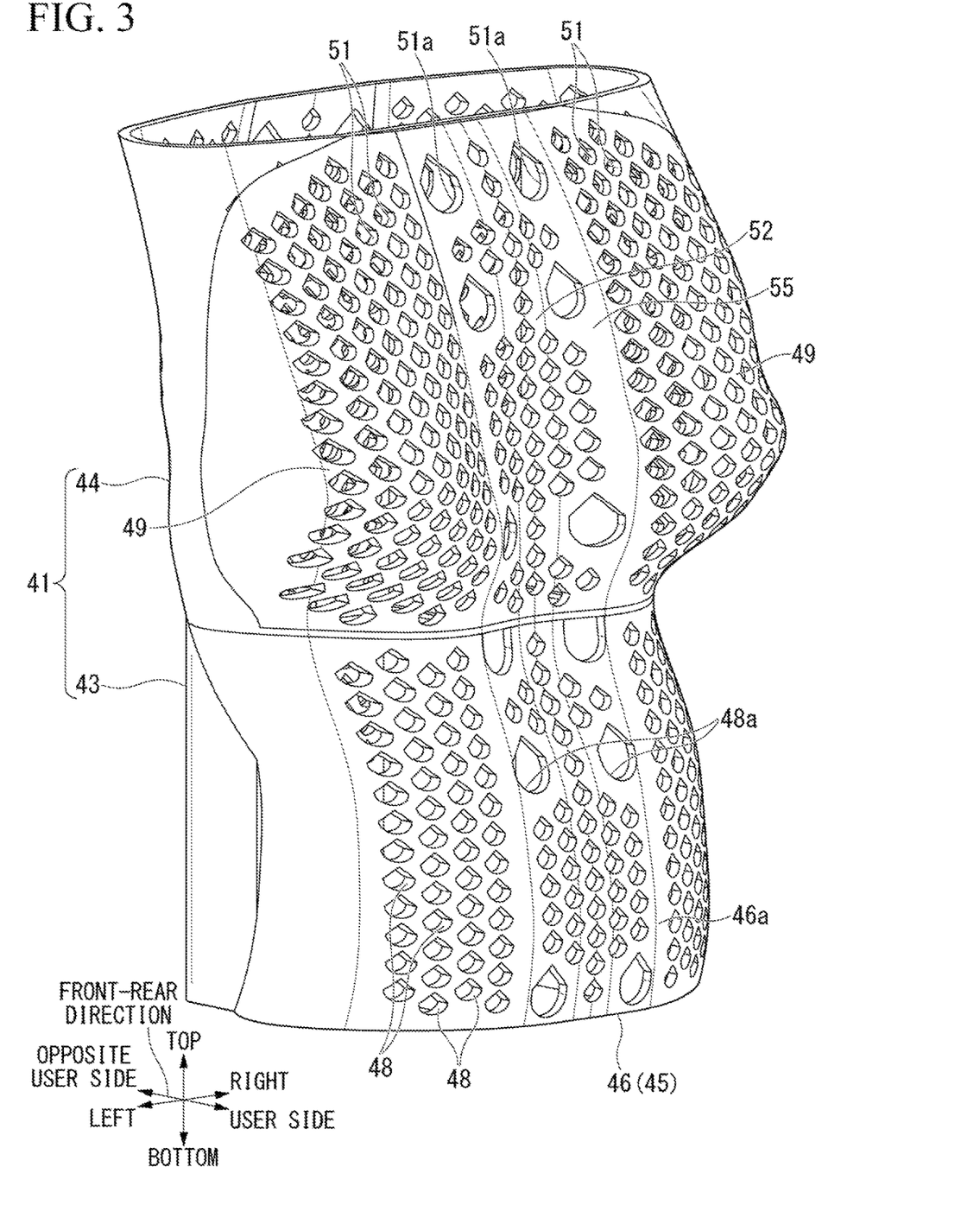
FIG. 3 is a perspective view of a framework in the embodiment of the present invention as viewed from a user side.
Figure 4:
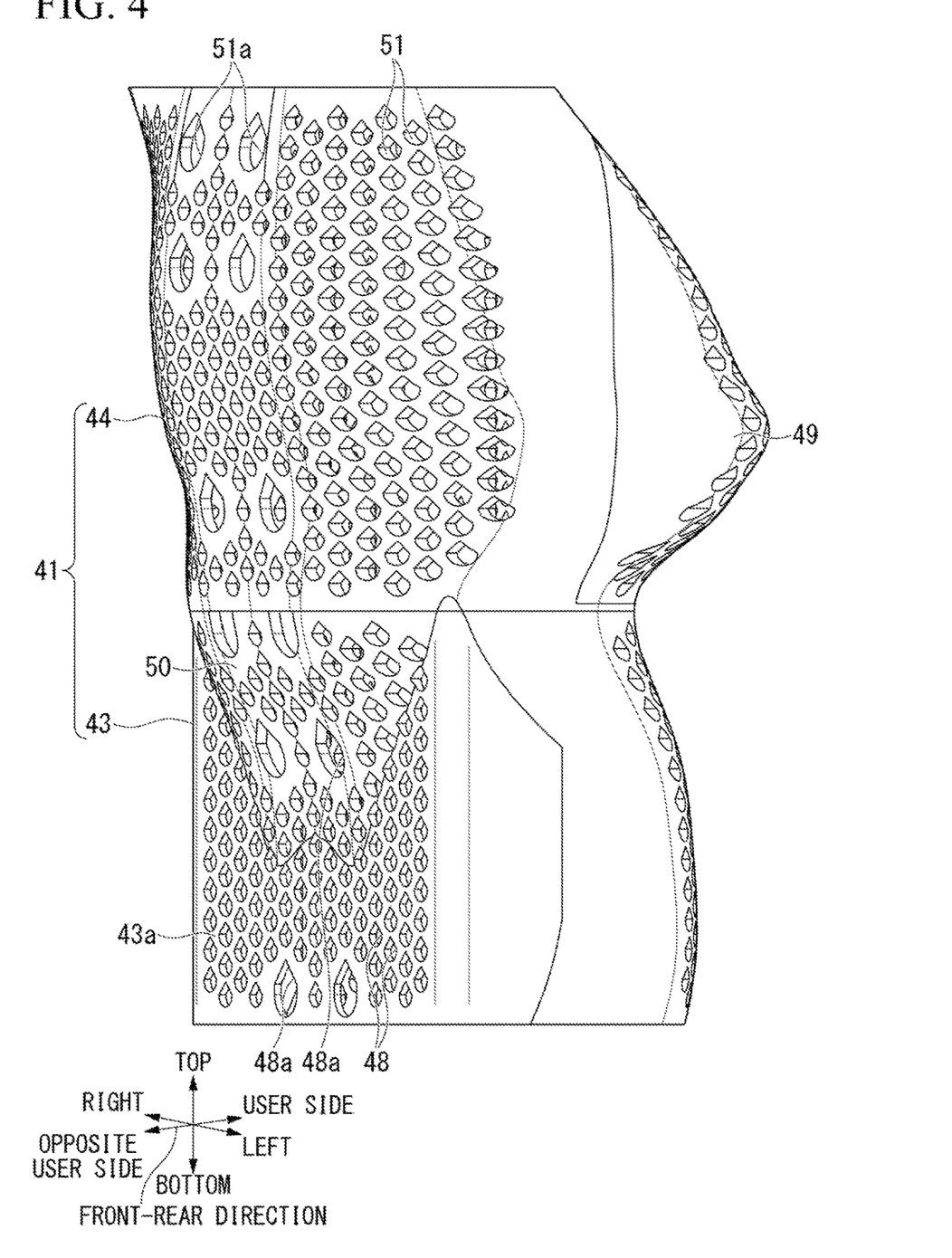
FIG. 4 is a perspective view of the framework in the embodiment of the present invention as viewed from a side opposite to the user.
Figure 5:
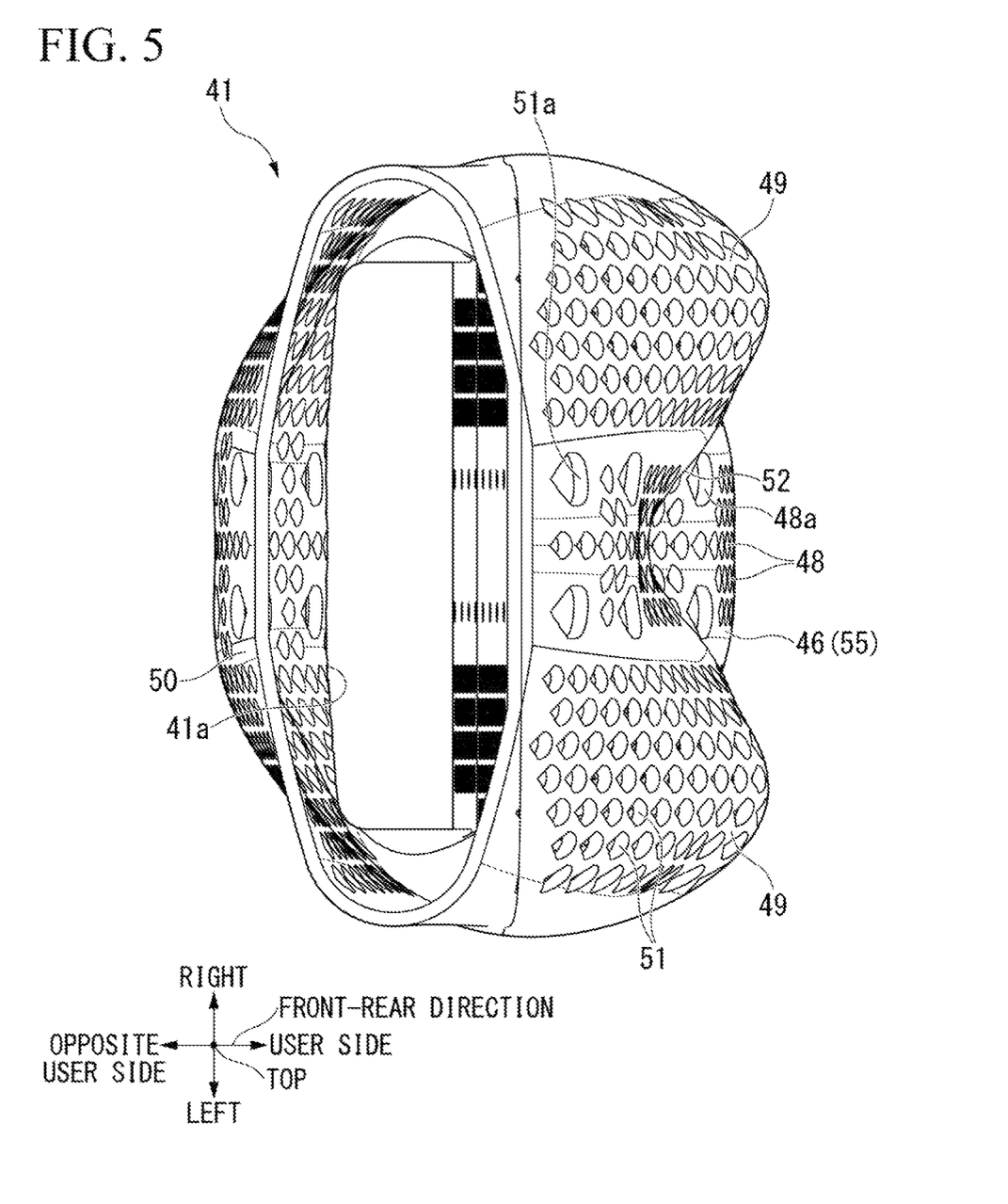
FIG. 5 is a plan view of the framework in the embodiment of the present invention as viewed from above.
Figure 6:
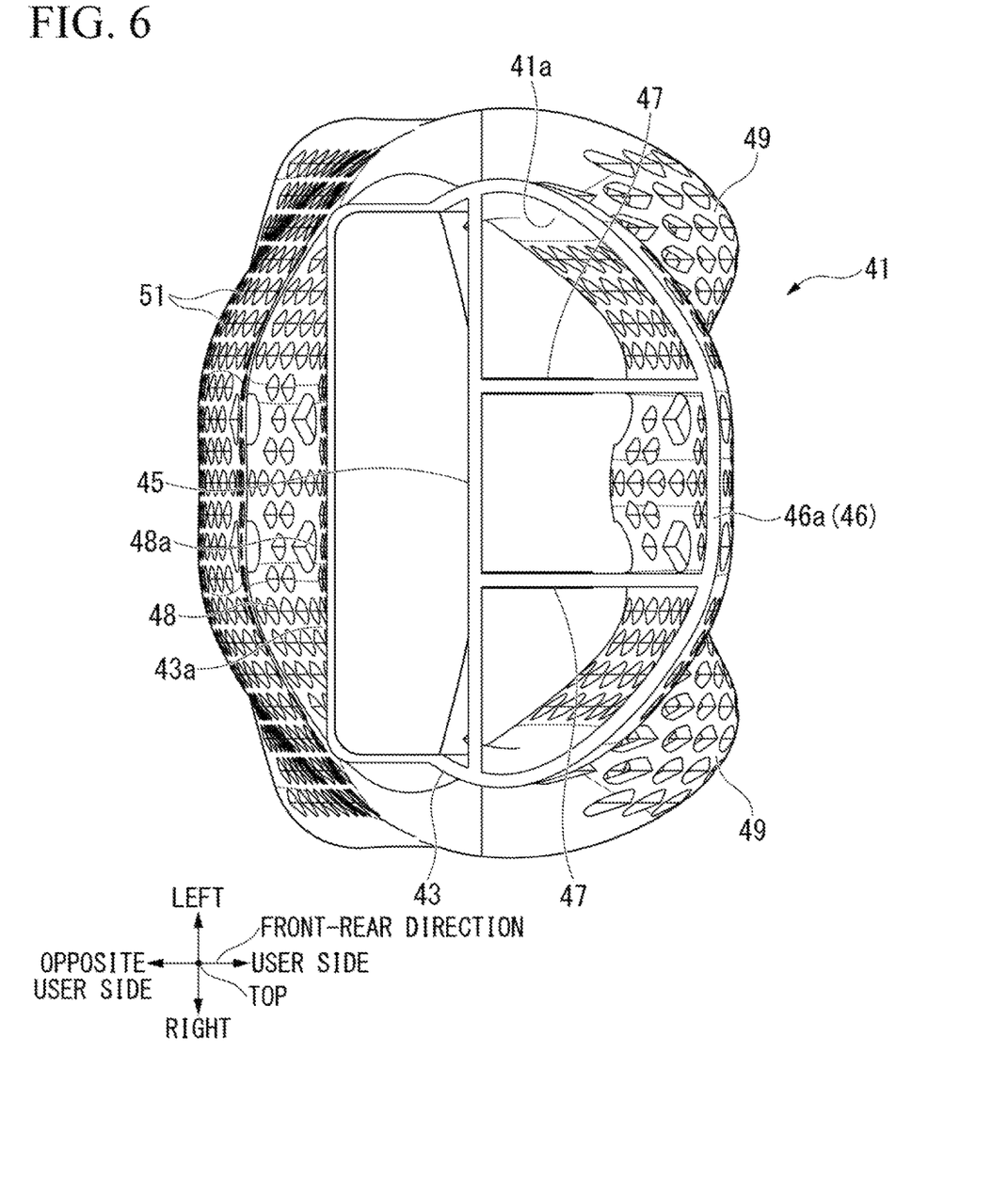
FIG. 6 is a plan view of the framework in the embodiment of the present invention as viewed from below.

FIG. 3 is a perspective view of the framework 41 as viewed from the user side. FIG. 4 is a perspective view of the framework 41 as viewed from the side opposite to the user. FIG. 5 is a plan view of the framework 41 as viewed from above. FIG. 6 is a plan view of the framework 41 as viewed from below.

As shown in FIGS. 2 to 6, the framework 41 is formed of, for example, a hard resin in a tubular shape having a hollow part 41a inside. The vertical length of the framework 41 is longer than the length from the buttocks Yd to the head Yt of the infant Y. The framework 41 has a lower body 43 and an upper body 44 integrally molded at an upper end of the lower body 43.

The lower body 43 mainly has a role of supporting the vicinity of the buttocks Yd of the infant Y. The lower body 43 is formed in an oval shape that is slightly longer in the left-right direction when viewed from the vertical direction as a whole. A plate-shaped lateral rib 45 facing in the left-right direction and the vertical direction is formed in the hollow part 41a of the lower body 43 at substantially the center in the front-rear direction. The lateral rib 45 is for increasing the mechanical strength of the vertical holding part 4. The side opposite to the user of the lateral rib 45 of the lower body 43 is formed in a rectangular shape that is longer in the left-right direction when viewed from the vertical direction. As a result, a flat part 43a facing the left-right direction and the vertical direction is formed on the side opposite to the user of the lower body 43.

A convex part 46 that curves so as to protrude toward the user side is formed on the user side of the lateral rib 45 of the lower body 43. The convex part 46 constitutes part of a front pad part 55 that supports the infant Y from the front.

Specifically explaining the convex part 46, the convex part 46 is curved such that a central side in the left-right direction bulges toward the user side rather than both sides in the left-right direction. The convex part 46 is curved to bulge toward the user side from an upper end to a lower end.

A plurality of ventilation holes 48 through which the outside of the lower body 43 communicates with the hollow part 41a are formed on the curved surface 46a of the convex part 46 on the user side and the flat part 43a on the side opposite to the user. The ventilation holes 48 are formed in a fan shape to widen downward. However, the shape of the ventilation holes 48 is not limited thereto, and can be various shapes such as a circle or a quadrangle. For example, by forming the ventilation holes 48 in a circular shape, it is possible to prevent stress from being locally applied to part of the ventilation holes 48 and to increase the mechanical strength of the framework 41. A plurality of large ventilation holes 48a having a larger opening area than other ventilation holes 48 are formed at the center in the left-right direction among the plurality of ventilation holes 48. The large ventilation holes 48a are disposed side by side in the vertical direction and in two rows in the left-right direction. The large ventilation hole 48a is used, for example, as a hole through which a tool or the like (not shown) used when assembling the vertical holding part 4 may pass. As a result, the ease of assembly of the vertical holding part 4 can be improved.

Two vertical ribs 47 extending between the lateral rib 45 and the curved surface 46a of the convex part 46 are formed in the hollow part 41a of the lower body 43. The two vertical ribs 47 are disposed side by side in the left-right direction. The upper part of the support plate 33 is attached to the two vertical ribs 47 in a freely rotatable manner. As a result, the vertical holding part 4 can be tilted toward the user side and the side opposite to the user with respect to the support plate 33.

The upper body 44 mainly has a role of supporting the vicinity of the head Yt of the infant Y. The upper body 44 is formed in an oval shape that is slightly longer in the left-right direction when viewed from the vertical direction as a whole. The surface of the upper body 44 on the user side is also configured as a front pad part 55 that supports the infant Y from the front. That is, the front pad part 55 supports the infant Y from the front over the entire area from the buttocks Yd to the head Yt of the infant Y Two bulging parts 49 that bulge toward the user side are formed in the front pad part 55 of the upper body 44. The two bulging parts 49 are disposed side by side in the left-right direction of the upper body 44.

The two bulging parts 49 are formed to bulge toward the center in the left-right direction from the two sides in the left-right direction. The two bulging parts 49 are formed over the entire vertical direction of the upper body 44. Therefore, a valley 52 is formed between the two bulging parts 49, that is, at the center of the upper body 44 in the left-right direction. The two bulging parts 49 are formed so as to bulge furthest slightly below the center of the upper body 44 in the vertical direction.

The side opposite to the user of the upper body 44 slightly bulges toward the side opposite to the user of the flat part 43a of the lower body 43. A protruding part 50 is formed downward in the lower part of the upper body 44 on the side opposite to the user. The protruding part 50 extends from the lower end of the upper body 44 to substantially the center of the flat part 43a in the vertical direction. The surface of the protruding part 50 is smoothly connected to the surface of the upper body 44. The protruding part 50 is formed to gradually taper downward when viewed from the front-rear direction. It is possible to increase the mechanical strength of the framework 41 due to the protruding part 50.

In such an upper body 44, a plurality of ventilation holes 51 through which the outside of the upper body 44 communicates with the hollow part 41a are formed on the front pad part 55 and the surface on the side opposite to the user. The shape of the ventilation holes 51 is the same as the shape of the ventilation holes 48 of the lower body 43. That is, the ventilation holes 51 are formed in a fan shape to widen downward. However, the shape of the ventilation holes 51 is not limited thereto and can be various shapes such as a circle or a quadrangle. A plurality of large ventilation holes 51a having a larger opening area than other ventilation holes 51 are formed at the center in the left-right direction (the valley 52 on the surface on the user side) among the plurality of ventilation holes 51. The large ventilation holes 51a are disposed side by side in the vertical direction and in two rows in the left-right direction.

<Band Support Part>

Returning to FIGS. 1 and 2, a band support part 60 is provided on the upper part of the vertical holding part 4. The band support part 60 is for supporting the carrier 5. The band support part 60 has two arms 61 disposed in the hollow part 41a of the framework 41 in the vertical holding part 4. The two arms 61 are disposed in the hollow part 41a of the framework 41. The two arms 61 have a long plate shape in the vertical direction, and are disposed so that a thickness direction becomes a left-right direction. The two arms 61 are disposed side by side in the left-right direction. The two arms 61 are fixed to an inner surface side of the framework 41 and are connected to a support plate 33 provided on the upper surface 23b of the turntable 23 in a tiltable manner (freely rotatably). The vertical holding part 4 is supported to be tiltable (freely rotatable) with respect to the axial direction of the support plate 33 via the support plate 33.

The upper parts of the two arms 61 protrude upward from the framework 41. A handle insertion hole 61a is formed in the protruding part. A columnar support handle 62 is inserted into the handle insertion hole 61a. The carrier 5 is supported by the support handle 62. The support handle 62 is inserted into the two handle insertion holes 61a and is formed to have a length that protrudes from both sides in the circumferential direction of the two arms 61. The support handles 62 are fixed to the two arms 61.

<Carrier>

As shown in FIG. 2, the carrier 5 attracts the infant Y to the vertical holding part 4 while holding the infant Y. The carrier 5 has a seat part 71 that holds the infant Y from the buttocks Yd to a back Yh thereof, and a lower band part 72 and an upper band part 73 that extend from the seat part 71.

Both ends of the lower band part 72 are joined to both sides of the seating surface 71a of the seat part 71 in the left-right direction to form a ring. The upper band part 73 is provided on both sides of the back pad part 71b of the seat part 71 in the left-right direction. Both end portions of each upper band part 73 are joined to the side portions of the corresponding back pad parts 71b to form a ring. The length of the upper band part 73 is adjustable.

With such a configuration, the carrier 5 is attached so that the lower band part 72 is wrapped around the lower part of the vertical holding part 4. The carrier 5 is attached to hook the upper band part 73 on the left and right sides of the support handle 62. That is, the upper band part 73 is suspended from the support handle 62.

Here, the band support part 60 is provided above the vertical holding part 4. That is, the support handle 62 is provided on the arm 61 that protrudes upward from the hollow part 41a of the framework 41. Since the upper band part 73 is suspended from such a support handle 62, the infant Y is attracted to the front pad part 55 side of the vertical holding part 4 by its own weight. Therefore, the infant Y can be held by the carrier 5 and the front pad part 55 of the vertical holding part 4.

The vertical holding part 4 is supported so that the vertical holding part 4 can be tilted with respect to the axial direction of the support shaft 26 via the support plate 33 provided on the upper surface 23b of the turntable 23. Therefore, for example, when the vertical holding part 4 is slightly tilted toward the side opposite to the user (see an arrow Y1 and an alternate long and short dash line in FIG. 2), the infant Y can be further leaned against the front pad part 55 of the vertical holding part 4. Therefore, by changing the angle of the vertical holding part 4, the infant Y can be brought into close contact with the vertical holding part 4. The infant Y can be reliably supported by the front pad part 55 of the vertical holding part 4.

<Preparation when Using Swing Holder>

Next, preparations for allowing the infant Y use the swing holder 1 will be described.

When the carrier 5 is attached to the swing holder 1, first, the carrier 5 is detached from the vertical holding part 4 and the band support part 60. Further, the seat part 71 of the carrier 5 is placed on the temporary seating surface 30. The infant Y is placed on the seat part 71 placed on the temporary seating surface 30. After that, the lower band part 72 is attached to the vertical holding part 4, and the upper band part 73 is attached to the band support part 60.

Then, the upper band part 73 is suspended from the support handle 62 of the band support part 60, and the infant Y is attracted to the front pad part 55 side of the vertical holding part 4 by its own weight. As a result, the infant Y is brought into close contact with the front pad part 55 of the vertical holding part 4, and the front pad part 55 supports the infant Y from the front. The carrier 5 supports the infant Y from rear. That is, the carrier 5 supports the support of the infant Y using the vertical holding part 4.

The vicinity of the buttocks Yd of the infant Y is supported by the lower body 43 of the vertical holding part 4. Since the convex part 46 is formed in the lower body 43, the infant Y can easily hold the lower body 43 with his/her legs. Further, the vicinity of the head Yt of the infant Y is supported by the upper body 44 of the vertical holding part 4. Two bulging parts 49 are formed side by side in the left-right direction on the upper body 44, and a valley 52 is formed between the bulging parts 49. The head Yt of the infant Y is stabilized by fitting the head Yt of the infant Y in the valley 52.

<Motion of Swing Holder>

Next, the motion of the swing holder 1 will be described.

The vertical holding part 4 of the swing holder 1 swings in three patterns of vertical swinging, pivot swinging, and vertical pivot swinging by operating the first swing mechanism part 11 and the second swing mechanism part 12. The vertical pivot swing is a combination of vertical swing and pivot swing. Each swinging motion allows the infant Y held by the swing holder 1 to experience a comfortable swing. Hereinafter, each swinging motion will be described in detail.

<Vertical Swinging Motion>

First, the vertical swinging motion will be described.

In the case of vertical swinging motion, only the first motor 17 of the first swing mechanism part 11 is driven. When the first motor 17 is driven, the swing guide 14 is rotated via the external gears 15 and 16. At this time, the rotation of the support shaft 26 of the second swing mechanism part 12 is restricted. Therefore, when the swing guide 14 is rotated, the roller 20 provided on the support shaft 26 is moved along the inclined surface 14b of the swing guide 14.

Then, the support shaft 26 swings vertically in response to the rotation of the swing guide 14. The turntable 23 swings vertically to follow the vertical swing of the support shaft 26. The vertical holding part 4 integrated with the turntable 23 via the support plate 33 also vertically swings (see an arrow Z in FIG. 1).

<Pivot Swinging Motion>

Next, the pivot swinging motion will be described.

In the case of pivot swinging motion, only the second motor 25 of the second swing mechanism part 12 is driven. When the second motor 25 is driven, the turntable 23 is pivots and swings within a predetermined rotation angle range via the link mechanism 24. The turntable 23 is provided in a freely rotatable manner with respect to the support shaft 26. Therefore, even if the turntable 23 is rotated, the support shaft 26 is not rotated.

That is, the relative positions between the roller 20 provided on the support shaft 26 and the swing guide 14 are not changed, and the roller 20 is not moved along the inclined surface 14b of the swing guide 14. As a result, the support shaft 26 does not swing vertically, and only the turntable 23 pivots and swings. When the turntable 23 pivots and swings, the vertical holding part 4 integrated with the turntable 23 via the support plate 33 also pivots and swings (see an arrow θ in FIG. 1).

<Vertical Pivot Swinging Motion>

Next, the vertical pivot swinging motion will be described.

In the case of the vertical pivot swinging motion, both the motors 17 and 25 of the first motor 17 of the first swing mechanism part 11 and the second motor 25 of the second swing mechanism part 12 are driven. Then, the swing guide 14 is rotated by the first motor 17 of the first swing mechanism part 11, and the support shaft 26 swings vertically. The turntable 23 and the vertical holding part 4 swing vertically following the vertical swing of the support shaft 26. The turntable 23 pivots and swings by the second motor 25 of the second swing mechanism part 12. Therefore, the vertical holding part 4 also pivots and swings. In this way, the vertical holding part 4 is simultaneously subjected to the vertical swinging motion and the pivot swinging motion.

Here, for example, when the parent holds and soothes the infant Y, the parent often shakes the infant up and down, while shaking left and right. That is, the vertical pivot swinging motion of the swing holder 1 can be made as similar as possible to the motion when the parent holds and soothes the infant Y.

In this way, the aforementioned swing holder 1 includes the vertical holding part 4 having the front pad part 55 that supports the infant Y from the front, and two swing mechanism parts 11 and 12 that swing the vertical holding part 4. Therefore, while maintaining the natural posture of the infant Y in the vertical direction by the vertical holding part 4, it is possible to make the infant Y feel a comfortable swing by the swing mechanism parts 11 and 12. Therefore, the infant Y can be soothed in a vertically held state.

The swing holder 1 includes a carrier 5. Therefore, the carrier 5 can support the maintenance of the infant Y by the vertical holding part 4. Therefore, the vertically held state of the infant Y can be further stabilized.

The carrier 5 has a seat part 71 that holds from the buttocks Yd to the back Yh of the infant Y, and a lower band part 72 and an upper band part 73 that extend from the seat part 71. A band support part 60 that suspends the upper band part 73 is provided above the vertical holding part 4. Therefore, the infant Y can be attracted to the front pad part 55 of the vertical holding part 4 by the carrier 5. As a result, the infant Y can be brought into close contact with the vertical holding part 4, and a feeling of security may be provided to the infant Y. Therefore, the infant Y can be more reliably soothed in a vertically held state.

A temporary seating surface 30 is attached to the upper surface 23b of the turntable 23 on the user side of the outer peripheral portion. That is, the temporary seating surface 30 is disposed below the vertical holding part 4. After the infant Y is placed on the temporary seating surface 30, the vertical holding part 4 can support the infant Y. Therefore, it is possible to reduce the burden on the parent or the like who uses the swing holder 1 to hold the infant Y.

The upper body 44 of the vertical holding part 4 (the framework 41) is formed with two bulging parts 49 that bulge toward the user side. Therefore, the infant Y can be supported by the vertical holding part 4, without placing the infant Y in an unreasonable posture. Compared with a case where the front pad part 55 of the upper body 44 is flat, the pressure on the infant Y can be reduced. Further, the head Yt of the infant Y can be disposed between the two bulging parts 49, and the head Yt can be stabilized.

The lower body 43 of the vertical holding part 4 (the framework 41) is formed with a convex part 46 that protrudes toward the user side. The convex part 46 can make it easier for the infant Y to hold the lower body 43 with his/her legs. Two bulging parts 49 are disposed side by side in the left-right direction above the convex part 46. Therefore, since the head Yt of the infant Y fits in the valley 52 formed between the bulging parts 49, the head Yt can be stabilized. In other words, it is possible to provide a feeling of security to the infant Y by simulating a mother's body in being supported by the vertical holding part 4.

The vertical holding part 4 includes a framework 41 that forms the outer shell of the vertical holding part 4, and a cushion part 42 that covers the outer surface of the framework 41 and is softer than the framework 41. By providing the cushion part 42, it is possible to reduce the discomfort of the infant Y supported by the vertical holding part 4.

The framework 41 is formed in a tubular shape having a hollow part 41a inside. A plurality of ventilation holes 48, 48a, 51 and 51a are formed in the framework 41. Therefore, the breathability between the vertical holding part 4 and the infant Y can be ensured, and stuffiness around the body of the infant Y can be prevented.

The vertical holding part 4 can be made to swing in three patterns of vertical swing, pivot swing, and vertical pivot swing by each of the swing mechanism parts 11 and 12. Therefore, it is possible to make each infant Y feel a comfortable swinging according to the preference of the infant Y using the swing holder.

The vertical holding part 4 is located substantially directly above the support shaft 26. In contrast, the center of gravity of the entire swing mechanism 3 is located on the side opposite to the user of the support shaft 26. That is, the three positions of the center of gravity of the swing mechanism are opposite to the position of the infant Y across the vertical holding part 4. Therefore, when the swing holder 1 is used, it is possible to prevent a situation in which the swing holder 1 tilts due to the weight of the infant Y and the swing holder 1 falls down.

Modified Example

Next, a modified example of the swing holder 1 will be described with reference to FIG. 7.

Here, the vertical holding part 4 and the band support part 60 of the swing holder 1 can be integrally detached from the support plate 33. In other words, the vertical holding part 4 is freely attachable from the swing mechanism 3 and can be used alone. Hereinafter, the usage pattern of the vertical holding part 4 will be described in detail.

Figure 7:
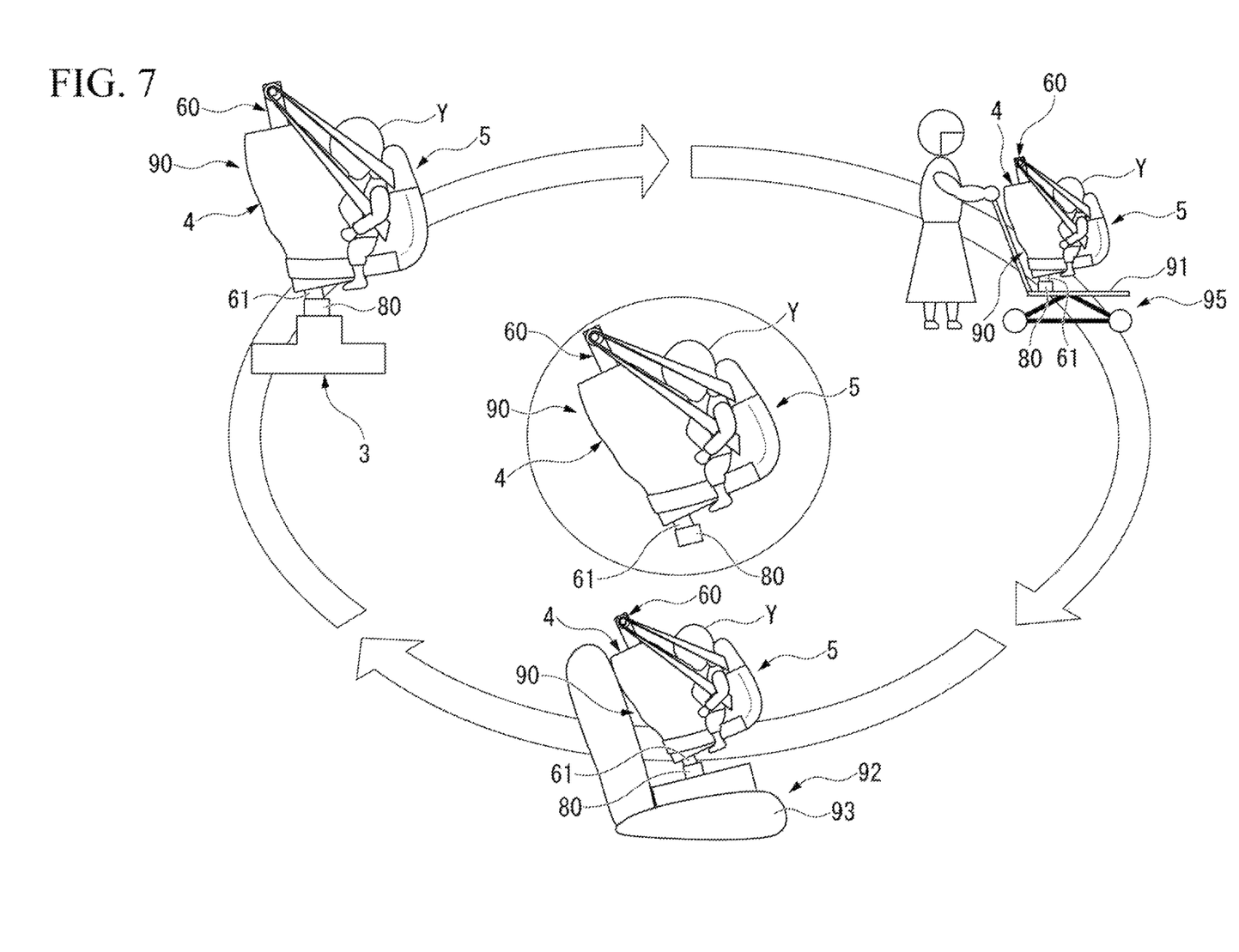
FIG. 7 is an explanatory view showing a usage pattern of a vertical holding part of a swing holder in a modified example of the embodiment of the present invention.

FIG. 7 is an explanatory view showing a usage pattern of the vertical holding part 4 of the swing holder 1.

As shown in FIG. 7, the vertical holding part 4 can be easily attached to and detached from various mounting bodies via the attachment 80 by providing the attachment 80 at the lower ends of the two arms 61 of the band support part 60. The mounting body is one to which the vertical holding part 4 is attached, and examples thereof include a baby carriage 95, a seat 94 of a vehicle 92 or the like, in addition to the swing mechanism 3.

That is, for example, the vertical holding part 4 can be attached to and detached from the swing mechanism 3 of the aforementioned swing holder 1 via the attachment 80. For example, the vertical holding part 4 can be attached to and detached from a seating surface 91 of the baby carriage 95 via the attachment 80. For example, the vertical holding part 4 can be attached to and detached from a seat seating surface 93 of the vehicle 92 via the attachment 80.

In this way, in the aforementioned modified example, only the vertical holding part 4 can be carried. The vertical holding part 4 can be attached to various mounting bodies (for example, the swing mechanism 3, the baby carriage 95, the seat 94 of the vehicle 92, etc.), and the vertical holding part 4 can be used in various situations and applications. Therefore, it is possible to provide a swing holder 1 that is easy to use.

The present invention is not limited to the above-described embodiment and includes various modifications to the above-described embodiment without departing from the spirit of the present invention.

For example, the case where the swing holder 1 includes the carrier 5 has been described in the above-described embodiment. However, the present invention is not limited thereto, and it is also possible to use a sling band different from the swing holder 1 as the carrier 5. Any sling band that can be supported by the band support part 60 of the swing holder 1 may be used.

The case where two bulging parts 49 disposed side by side in the left-right direction are formed in the vertical holding part 4 has been described. However, the present invention is not limited thereto, and at least one bulging part 49 may be formed in the vertical holding part 4. If the vertical holding part 4 has one bulging part 49, the infant Y can easily hold the vertical holding part 4.

The case where the vertical holding part 4 has a convex part 46 curved to protrude toward the user side formed on the side closer to the user side than the lateral rib 45 of the lower body 43 has been described. However, the present invention is not limited thereto, and the lower body 43 may be flat without forming the convex part 46. The case where the vertical length of the framework 41 in the vertical holding part 4 is longer than the length from the buttocks Yd to the head Yt of the infant Y has been described. However, the present invention is not limited thereto, and the length of the framework 41 in the vertical direction may be a length in which the infant Y can be supported from the front at least from an abdominal Yf to a chest Yk of the infant Y (see FIG. 2).

The case where the seat part 71 has a seating surface 71a and a back pad part 71b to hold from the buttocks Yd to the back Yh of the infant Y has been described. However, the present invention is not limited thereto, and the seat part 71 may hold at least the back Yh of the infant Y. In this case, the infant Y is seated on, for example, the temporary seating surface 30. A seating surface on which the infant Y is seated may be provided in place of the temporary seating surface 30.

The case where the carrier 5 has a seat part 71 for holding from the buttocks Yd to the back Yh of the infant Y, and a lower band part 72 and an upper band part 73 extending from the seat part 71 has been described. However, the invention is not limited thereto, and any structure may be used as long as the infant Y can be supported from below and the back Yh. The carrier 5 may not have a band part attached to the band support part 60.

The infant Y may be supported only by the vertical holding part 4 without using the carrier 5. In this case, the vertical holding part 4 is tilted so that the infant Y leans against the vertical holding part 4 (see the vertical holding part 4 indicated by the alternate long and two short dash lines in FIG. 2), and the infant Y may be preferably surely supported from front by the front pad part 55 of the vertical holding part 4. In this case, the infant Y is seated on the temporary seating surface 30.

The case where the swing holder 1 has two swing mechanism parts 11 and 12 has been described. Further, the case where the vertical holding part 4 swings in three patterns of vertical swing, pivot swing, and vertical pivot swing by operating the first swing mechanism part 11 and the second swing mechanism part 12 has been described. However, the present invention is not limited thereto, and the swing holder 1 may have one of the swing mechanism parts 11 and 12. Further, the vertical holding part 4 may swing in one of the three patterns of vertical swing, pivot swing, and vertical pivot swing.

The case where the turntable 23 of the swing holder 1 is provided to be freely rotatable with respect to the support shaft 26 has been described. However, the present invention is not limited thereto, and the turntable 23 and the support shaft 26 may be integrated. In this case, in the vertical swinging motion of the vertical holding part 4, only the first swing mechanism part 11 is driven as in the above-described embodiment.

In the case of the pivot swinging motion of the vertical holding part 4, the first swing mechanism part 11 and the second swing mechanism part 12 are driven synchronously. As a result, the relative positions between the rollers 20 provided on the support shaft 26 and the swing guide 14 do not change. Therefore, only the pivot swinging motion of the vertical holding part 4 can be performed without swinging vertically.

In the case of vertical pivot swinging motion of the vertical holding part 4, only the second swing mechanism part 12 is driven. As a result, the support shaft 26 is pivoted while the roller 20 moves along the inclined surface 14b of the swing guide 14. Therefore, the vertical swinging motion of the vertical holding part 4 is performed.

The case where the vertical holding part 4 includes the framework 41 having the hollow part 41a has been described. The case where only the arm 61 of the band support part 60 is disposed in the hollow part 41a has been described. However, the present invention is not limited thereto, and a sound source such as a speaker may be provided in the hollow part 41a so that the sound is output from the vertical holding part 4. A heat source such as a heater may be provided in the hollow part 41a so that the temperature of the vertical holding part 4 can be adjusted. For example, a fragrance may be provided in the hollow part 41a so that scent can be emitted from the vertical holding part 4. With these configurations, the infant Y can be further relaxed.

The case where the vertical holding part 4 can be easily attached to and detached from various attachment bodies via the attachment 80 by the attachment 80 provided at the lower ends of the two arms 61 of the band support part 60 has been described. However, the present invention is not limited thereto, and the vertical holding part 4 and the attachment 80 may be integrated. For example, the attachment 80 may be provided on the support plate 33 or the attachment 80 may be provided directly on the framework 41.

What is claimed is:

1. A holder comprising:
    a vertical holding part configured to support a user in a vertical posture so that a head is positioned vertically, wherein the vertical holding part has a front pad part extending in a vertical direction and configured to support the user from a front of the user, at least from an abdomen to a chest of the user,
    wherein at least one bulging part is formed in an upper part of the vertical holding part, wherein a central part of the at least one bulging part in a left-right direction is adapted to bulge toward a user side from both sides in the left-right direction orthogonal to a direction between the user side and a side opposite to the user and the vertical direction, the at least one bulging part extending in the vertical direction of the vertical holding part, and
    wherein a convex part is formed in a lower part of the vertical holding part, wherein a central part of the convex part in the left-right direction is adapted to protrude toward the user side from both sides in the left-right direction.

2. The holder according to claim 1, further comprising:
    a carrier configured to support a lower side and a back of the user.

3. The holder according to claim 2, wherein
the carrier has a seat part configured to hold at least the back of the user and a band part configured to suspend the seat part, and
the holder includes a band support part provided above the vertical holding part and configured to support the band part.

4. The holder according to claim 1, wherein a temporary seating surface on which the user is placeable is provided below the vertical holding part.

5. The holder according to claim 1, wherein two bulging parts are disposed side by side in the left-right direction.

6. The holder according to claim 1, wherein the vertical holding part is attachable to and detachable from a mounting body.

7. The holder according to claim 6, further comprising:
an attachment configured to attach and detach the vertical holding part to and from the mounting body.

8. The holder according to claim 6, wherein the mounting body is a baby carriage.

9. The holder according to claim 6, wherein the mounting body is a seat of a vehicle.

10. The holder according to claim 1, wherein the vertical holding part is formed in a tubular shape having a hollow part inside.

11. The holder according to claim 10, wherein a plurality of ventilation holes through which an outside of the vertical holding part communicates with the hollow part are formed on the user side and the side opposite to the user of the vertical holding part.

\* \* \* \* \*